United States Patent
Tamura et al.

(10) Patent No.: US 8,506,723 B2
(45) Date of Patent: Aug. 13, 2013

(54) ALKALINE DETERGENT COMPOSITION FOR USE ON HARD SURFACES

(75) Inventors: Atsushi Tamura, Wakayama (JP); Sadaharu Miyamoto, Wakayama (JP)

(73) Assignee: KAO Corporation, Tokyo (JP)

( * ) Notice: Subject to any disclaimer, the term of this patent is extended or adjusted under 35 U.S.C. 154(b) by 0 days.

(21) Appl. No.: 13/577,352

(22) PCT Filed: Dec. 27, 2010

(86) PCT No.: PCT/JP2010/073508
§ 371 (c)(1),
(2), (4) Date: Aug. 6, 2012

(87) PCT Pub. No.: WO2011/102058
PCT Pub. Date: Aug. 25, 2011

(65) Prior Publication Data
US 2012/0302482 A1 Nov. 29, 2012

(30) Foreign Application Priority Data

Feb. 16, 2010 (JP) .................... 2010-031282

(51) Int. Cl.
*B08B 3/04* (2006.01)
*C11D 1/12* (2006.01)
*C11D 1/22* (2006.01)
*C11D 1/66* (2006.01)
*C11D 3/37* (2006.01)

(52) U.S. Cl.
USPC ........ 134/22.19; 134/25.2; 134/25.4; 134/39; 134/40; 134/42; 510/162; 510/163; 510/164; 510/165; 510/166; 510/167; 510/168; 510/169; 510/170; 510/171; 510/172; 510/173; 510/174; 510/175; 510/179; 510/181; 510/219; 510/243; 510/420; 510/421; 510/424; 510/426; 510/435; 510/488; 510/492

(58) Field of Classification Search
USPC ............. 510/162–175, 179, 181, 219, 243, 510/420, 421, 424, 426, 435, 488, 492; 134/22.19, 25.2, 25.4, 39, 40, 42
See application file for complete search history.

(56) References Cited

U.S. PATENT DOCUMENTS

2009/0312219 A1 12/2009 Tamura et al.
2010/0255410 A1 10/2010 Tamura et al.

FOREIGN PATENT DOCUMENTS

| JP | 8-283974 A | 10/1996 |
|---|---|---|
| JP | 2000-309796 A | 11/2000 |
| JP | 2003-313584 A | 11/2003 |
| JP | 2007-291328 A | 11/2007 |
| JP | 2009-21377 A | 1/2009 |
| JP | 2009-84565 A | 4/2009 |
| JP | 2009-84568 A | 4/2009 |
| JP | 2009-206481 * | 9/2009 |
| JP | 2009-206481 A | 9/2009 |
| JP | 2010-86563 A | 4/2010 |

OTHER PUBLICATIONS

International Search Report for PCT/JP2010/073508 dated Feb. 1, 2011.

* cited by examiner

*Primary Examiner* — Brian P Mruk
(74) *Attorney, Agent, or Firm* — Birch, Stewart, Kolasch & Birch, LLP

(57) ABSTRACT

An alkaline detergent composition for hard surface comprises an alkaline agent (component A), a nonionic surfactant (component B), a chelating agent (component C), water (component D), at least one carboxylic acid compound (component E) selected from the group consisting of compounds represented by general formula (1) and general formula (2), and at least one anionic surfactant (component F) selected from the group consisting of surfactants represented by general formula (3) and salts thereof. Therein, the content ratio [component E (weight %)/component B (weight %)] is 1/1.5-15/1, the content ratio [component F (weight %)/component B (weight %)] is 10/1-1/5, and the pH at 25° C. is 12 or greater.

9 Claims, No Drawings

ALKALINE DETERGENT COMPOSITION FOR USE ON HARD SURFACES

TECHNICAL FIELD

The present invention relates to an alkaline detergent composition for hard surface, and a method for cleaning a glass surface using the composition.

BACKGROUND ART

In recent memory hard disk drives, there is a demand for decreasing a flying height of a magnetic head so as to enhance a recording density, thereby reducing a unit recording area, for the purpose of achieving a high capacity and a small diameter. In connection with this, even in a process of producing a hard disk, the surface quality such as cleanliness required of a polished surface obtained by polishing an object to be polished is increasing.

The process of producing a hard disk includes a substrate formation step and a media step. In the substrate formation step, a substrate to be polished is subjected to a polishing treatment and a cleaning treatment in this order a plurality of times, whereby a substrate for a hard disk is produced. In the media step, small unevenness is provided to at least one of the principal surfaces of the substrate for a hard disk by polishing as required (texture step), and then the substrate is cleaned (cleaning step) and subsequently a magnetic layer is formed on at least one of the principal surfaces of the substrate (magnetic layer formation step).

In a case where the detergent composition contains a surfactant, a nonionic surfactant is used favorably from the viewpoint of cleaning property (see Patent documents 1-3). Patent document 1 discloses, as a detergent composition containing a nonionic surfactant and having a high cleaning property, an alkaline detergent composition containing not only a nonionic surfactant but a chelating agent and an anionic surfactant.

PRIOR ART DOCUMENTS

Patent Documents

Patent document 1: JP 2003-313584
Patent document 2: JP 2000-309796
Patent document 3: JP 2007-291328

DISCLOSURE OF INVENTION

Problem to be Solved by the Invention

Recently, with the demand for high cleaning property, cost reduction has been demanded severely. In order to cope with such demand, it is required to prepare a concentrate of the detergent composition and to dilute the concentrate in accordance with the use. Therefore, the detergent composition is required to have a high storage stability in high concentration as it is transported in high concentration while having excellent cleaning property at the time of being diluted and used. However, conventional detergent compositions cannot meet the conditions sufficiently.

Further, in the high-alkaline detergent composition containing a nonionic surfactant, a cloud point develops in general. If this cloud point is low, the product quality can be damaged due to the temperature change during transportation or the like. In some cases, a solubilizer of a nonionic surfactant is blended in the high-alkaline detergent composition for the purpose of raising the cloud point. However, conventional solubilizers cannot provide sufficient storage stability at high and low temperatures, and thus the product quality has been damaged due to temperature change during transportation and/or storage. When the product quality is damaged, use at normal blending quantity and ratio cannot be ensured, and deterioration in the product quality may cause cleaning failures or the like.

Therefore, the present invention provides an alkaline detergent composition for hard surface achieving simultaneously a high cleaning property and a high storage stability in high concentration, and a method for cleaning a glass surface with the detergent composition.

Means for Solving Problem

An alkaline detergent composition for hard surface of the present invention includes:
an alkaline agent (component A);
a nonionic surfactant (component B);
a chelating agent (component C);
water (component D);
at least one carboxylic acid compound (component E) selected from the group consisting of compounds represented by general formula (1) and general formula (2) below; and
at least one anionic surfactant (component F) selected from the group consisting of surfactants represented by general formula (3) and salts thereof,
where the content ratio [component E (weight %)/component B (weight %)] is 1/1.5-15/1,
the content ratio [component F (weight %)/component B (weight %)] is 10/1-1/5, and
a pH at 25° C. is 12 or greater.

In the general formula (1) below, $R^1$ is a linear or branched alkyl group having a carbon number of 4 to 8, EO is an oxyethylene group, the character n represents an average number added moles of EO which meets $1 \leq n \leq 10$.

$$R^1-O-(EO)_n-CH_2COOH \tag{1}$$

In the general formula (2) below, $R^2$ is a linear or branched alkyl group having a carbon number of 4 to 10.

$$R^2COOH \tag{2}$$

[Chemical formula 1]

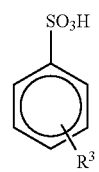

(3)

In the general formula (3) above, $R^3$ is a linear or branched alkyl group having a carbon number of 8 to 18.

A method for cleaning a glass surface of the present invention includes a cleaning step of cleaning a substrate to be cleaned having a glass surface with a diluted solution obtained by diluting to 10 to 500-fold the alkaline detergent composition for hard surface of the present invention. The content of the components other than water (component D) of the alkaline detergent composition for hard surface is 10 to 60 weight %.

Effects of the Invention

In the alkaline detergent composition for hard surface of the present invention, a high cleaning property and a high storage stability in high concentration are achieved simultaneously. Therefore, a highly purified glass surface can be obtained by a method for cleaning a glass surface with the alkaline detergent composition for hard surface of the present invention.

DESCRIPTION OF THE INVENTION

The alkaline detergent composition for hard surface of the present invention (hereinafter, this may be abbreviated as simply "detergent composition") is a high-alkaline detergent composition having pH of 12 or greater at 25° C., which contains a specific carboxylic acid compound (component E) as a solubilizer for the nonionic surfactant, contains a carboxylic acid compound (component E) and the nonionic surfactant (component B) at a specific content ratio, and contains the anionic surfactant (component F) and the nonionic surfactant (component B) at a specific content ratio. Thereby, the high cleaning property and the high storage stability in high concentration are achieved simultaneously.

Hereinafter, the respective components contained in the detergent composition of the present invention will be explained.

[Alkaline Agent (Component A)]

The alkaline agent (component A) contained in the detergent composition of the present invention may be either an inorganic alkaline agent or an organic alkaline agent. Examples of the inorganic alkaline agents include ammonium, potassium hydroxide, sodium hydroxide and the like. At least one example of the organic alkaline agent is selected from the group consisting of hydroxyalkyl amine, tetramethyl ammonium hydroxide and choline. These alkaline agents may be used singly or as a mixture of two or more.

Examples of the hydroxyalkyl amine include monoethanolamine, diethanolamine, triethanolamine, methyl ethanolamine, methyl diethanolamine, monopropanolamine, dipropanolamine, tripropanolamine, methyl propanolamine, methyl dipropanolamine, aminoethyl ethanolamine and the like.

Among the above-described alkaline agents, from the viewpoint of enhancing dispersibility of fine particles of the detergent composition, enhancing the storage stability in high concentration, and easiness in etching control with respect to glass in particular, at least one alkaline agent selected from the group consisting of potassium hydroxide, sodium hydroxide, monoethanolamine, methyldiethanolamine, and aminoethylethanolamine is preferred. Further preferred is at least one selected from the group consisting of potassium hydroxide and sodium hydroxide.

From the viewpoint of enhancing the dispersibility of fine particles of the detergent composition, enhancing the stability in high concentration, and easiness in etching control with respect to glass in particular, the content of the alkaline agent in the detergent composition of the present invention is preferably 2 to 60 weight %, more preferably 10 to 50 weight %, and even more preferably 30 to 45 weight % when the total content of the components other than water is 100 weight %.

The pH of the detergent composition of the present invention at 25° C. is 12 or greater, and there is no particular upper limit insofar as the glass surface is not defected. From the viewpoint of enhancing the dispersibility of the inorganic fine particles, it is preferably 12 to 14, more preferably 13 to 14, and even more preferably 13.0 to 14.0. The pH can be measured by using a pH meter (HM-30G manufactured by DKK-TOA CORPORATION), and it indicates a numerical value taken 40 minutes after immersing an electrode in the detergent composition. It should be noted that the detergent composition of the present invention achieves a high storage stability in high concentration, namely, components other than water in the detergent composition are dissolved homogeneously in the water (component D). Therefore, even if the pH exceeds 12 partially, an insoluble detergent composition in which any of the components other than water is not dissolved is excluded from the detergent compositions of the present invention.

[Nonionic Surfactant (Component B)]

For the nonionic surfactant (component B) contained in the detergent composition of the present invention, the nonionic surfactant represented by the following general formula (4) are preferred from the viewpoint of enhancing the cleaning property of the detergent composition and the storage stability in high concentration.

$$R^4\text{—O-(EO)}_m(\text{PO})_p\text{—H} \quad (4)$$

In the general formula (4) above, $R^4$ is an alkyl group having a carbon number of 8 to 18, an alkenyl group having a carbon number of 8 to 18, an acyl group having a carbon number of 8 to 18 or alkylphenyl group having a carbon number of 14 to 18. EO is an oxyethylene group and PO is an oxypropylene group. The characters m and p represent the average number of added moles of EO and PO, respectively. The character m represents a number from 1 to 20 and p represents a number from 0 to 20.

From the viewpoint of further enhancing the cleaning property of the detergent composition, $R^4$ is more preferably an alkyl group having a carbon number of 8 to 14, an alkenyl group having a carbon number of 8 to 14, an acyl group having a carbon number of 8 to 14 or an alkylphenyl group having a carbon number of 14 to 16, and more preferably an alkyl group having a carbon number of 8 to 14, from the viewpoint of simultaneously achieving enhancement in the cleaning property of the detergent composition and the high storage stability in high concentration.

$(\text{EO})_m(\text{PO})_p$ may be composed solely of an oxyethylene group, and it may be composed of an oxyethylene group and an oxypropylene group. When $(\text{EO})_m(\text{PO})_p$ is composed of an oxyethylene group and an oxypropylene group, the arrangement of EO and PO may be either block or random. When the arrangement of EO and PO is block, insofar as the average number of added moles are within the aforementioned ranges, the number of EO blocks and the number of PO blocks may each be one or may each be two or more. When the number of blocks composed of EO is two or more, how many times EO repeats in each block may be the same with each other or may be different. When the number of PO blocks is two or more, how many times PO repeats in each block may also be the same with each other or may be different.

When the arrangement of EO and PO is block or random, the molar ratio of EO to PO ($M_{EO}/M_{PO}$) being 9.5/0.5 to 5/5 is preferable for simultaneously achieving a high ability to dissolve oil and an ability to be highly dissolved in water. Moreover, from the viewpoint of simultaneously achieving water solubility and low foamability, m is preferably 1 to 15, and more preferably 1 to 10. From the viewpoint of simultaneously achieving water solubility and low foamability, p is preferably 1 to 15 and more preferably 1 to 10, and m+p is preferably 1 to 30 and more preferably 1 to 20.

Specific examples of compounds represented by the general formula (4) may be compounds obtained by adding an oxyethylene group and/or an oxypropylene group to alcohols such as 2-ethylhexanol, octanol, decanol, isodecyl alcohol, tridecyl alcohol, lauryl alcohol, myristyl alcohol, stearyl alcohol, oleyl alcohol and the like; phenols such as octyl phenol, nonyl phenol, dodecyl phenol and the like; etc. The compounds represented by the general formula (4) may be used singly or may be used as a mixture of two or more.

From the viewpoint of enhancing the cleaning property of the detergent composition against organic dirt and enhancing the storage stability in high concentration, the content of the nonionic surfactant in the detergent composition of the present invention is preferably 2 to 35 weight %, and more preferably 5 to 30 weight %, and even more preferably 10 to 20 weight % when the total content of components other than water is 100 weight %.

[Chelating Agent (Component C)]

Examples of chelating agents (component C) contained in the detergent composition of the present invention are aldonic acids such as gluconic acid, glucoheptonic acid and the like; aminocarboxylic acids such as ethylenediaminetetraacetic acid and the like; hydroxycarboxylic acids such as citric acid, malic acid and the like; phosphonic acids such as amino trimethylene phosphonic acid, hydroxyethylidenediphosphonic acid and the like; and alkali metal salts, lower amine salts, ammonium salts and alkanol ammonium salts thereof. Among them, from the viewpoint of enhancing the cleaning property of the detergent composition against metallic dirt and enhancing the storage stability in high concentration, gluconic acid, amino trimethylene phosphonic acid, hydroxyethylidenediphosphonic acid; and the alkali metal salts, lower amine salts, ammonium salts or alkanol ammonium salt thereof are preferred. These chelating agents may be used singly or as a mixture of two or more.

From the viewpoint of enhancing the cleaning property of the detergent composition against metallic dirt and enhancing the storage stability in high concentration, the content of the chelating agent in the detergent composition of the present invention is preferably 5 to 35 weight %, more preferably 10 to 35 weight %, and even more preferably 15 to 30 weight % when the total content of the components other than water is 100 weight %.

[Water (Component D)]

Water (component D) contained in the detergent composition is not particularly limited insofar as it can serve as a solvent, and the examples may be ultrapure water, pure water, ion exchange water, distilled water and the like. Ultrapure water, pure water and ion exchange water are preferable, and ultrapure water is more preferable. Pure water and ultrapure water can be obtained by, for example, passing tap water through activated carbon, followed by ion exchange treatment, distillation, and as necessary, irradiation using a specific ultraviolet germicidal lamp, or passing through a filter. For example, in many cases, the electric conductivity of pure water at 25° C. is 1 µS/cm or less, and ultrapure water exhibits 0.1 µS/cm or less. Though the detergent composition may further contain a water-soluble organic solvent (for example, an alcohol such as ethanol) as a solvent in addition to water as described above, it is preferable that the solvent contained in the detergent composition is composed solely of water.

[Ether Carboxylate and Fatty Acid (Component E)]

From the viewpoint of enhancing the storage stability of the detergent composition in high concentration, the detergent composition of the present invention contains at least one compound (component E) selected from the group consisting of ether carboxylate represented by the general formula (1) below and a fatty acid represented by the general formula (2) below.

$$R^1\text{—O-(EO)}_n\text{—CH}_2\text{COOH} \tag{1}$$

From the viewpoint of achieving simultaneously enhancement in the storage stability at high temperature and enhancement in the storage stability at low temperature of the detergent composition in high concentration, it is required that $R^1$ in the general formula (1) is a linear or branched alkyl group having a carbon number of 4 to 8, and that the average number n of added moles of EO (oxyethylene group) meets $1 \leq n \leq 10$. It is preferable that $R^1$ is a linear or branched alkyl group having a carbon number of 6 to 8. Preferably n is 2 to 10, and more preferably, 3 to 8.

$$R^2\text{COOH} \tag{2}$$

From the viewpoint of achieving simultaneously enhancement in the storage stability of the detergent composition in high concentration at high temperature and enhancement in the storage stability of the detergent composition in high concentration at low temperature, it is required that $R^2$ in the general formula (2) is a linear or branched alkyl group having a carbon number of 4 to 10. It is preferable that $R^2$ is a linear or branched alkyl group having a carbon number of 6 to 9.

Examples of the ether carboxylates represented by the above general formula (1) are polyoxyethylene butylether acetic acid, polyoxyethylene hexylether acetic acid, polyoxyethylene octylether acetic acid, and the like. From the viewpoint of achieving simultaneously enhancement in the storage stability at high temperature and enhancement in the storage stability at low temperature of the detergent composition in high concentration, polyoxyethylene hexylether acetic acid and polyoxyethylene octylether acetic acid are preferred. Examples of the fatty acids represented by the general formula (2) are valeric acid, caproic acid, enanthic acid, caprylic acid, pelargonic acid, capric acid, 2-ethylhexyl acid, isononanoic acid, and the like. From the similar viewpoint, 2-ethylhexyl acid is preferred. And among the ether carboxylates represented by the above general formula (1) and the fatty acids represented by the above general formula (2), from the similar viewpoint, ether carboxylate represented by the general formula (1) is preferred. These compounds may be used singly or as a mixture of two or more.

From the viewpoint of achieving simultaneously enhancement in the storage stability at high temperature and enhancement in the storage stability at low temperature in high concentration, the content of the component E in the detergent composition of the present invention is preferably 5 to 60 weight %, more preferably 5 to 40 weight %, and even more preferably 10 to 30 weight % when the total content of the components other than water is 100%.

[Anionic Surfactant (Component F)]

From the viewpoint of enhancing the cleaning property of the detergent composition against fine particles and enhancing the storage stability in high concentration, the detergent composition of the present invention contains at least one anionic surfactant (component F) selected from the group consisting of compounds represented by a general formula (3) and salts thereof.

[Chemical formula 2]

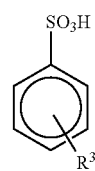

(3)

From the viewpoint of enhancing the cleaning property of the detergent composition against the fine particles and enhancing the storage stability in high concentration, $R^3$ in the general formula (3) is a linear or branched alkyl group having a carbon number of 8 to 18, and preferably a linear or branched alkyl group having a carbon number of 10 to 14. Though the bonding position of $R^3$ is arbitrary, preferably it is bonded to a para-position.

Specific examples of the salts of compounds represented by the general formula (3) are alkali metal salts such as sodium salt, potassium salt and the like, alkaline earth metal salts such as calcium salt, ammonium salts such as tetramethyl ammonium hydroxide and the like, organic amine salts such as alkanol amine salt and the like.

Specific examples of the component F are sodium octylbenzenesulfonate, sodium dodecylbenzenesulfonate and the like. Sodium dodecylbenzenesulfonate is preferred.

From the viewpoint of enhancing the cleaning property of the detergent composition against fine particles and enhancing the storage stability in high concentration, the content of the anionic surfactant (component F) in the detergent composition of the present invention is preferably 2 to 30 weight %, more preferably 2 to 20 weight %, and even more preferably 2 to 10 weight % when the total content of the components other than water is 100 weight %.

From the viewpoint of achieving simultaneously enhancement in the cleaning property of the detergent composition and enhancement in the storage stability of the detergent composition in high concentration at high temperature and at low temperature, the content ratio of the carboxylic acid compound (component E) to the nonionic surfactant (component B) [component E (weight %)/component B (weight %)] is 1/1.5 to 15/1, preferably 1/1 to 12/1, and more preferably 1/1 to 5/1. With the above-mentioned content ratio, it is possible to achieve simultaneously the high cleaning property of the detergent composition and the storage stability in high concentration, thereby the effect of the present invention will be achieved.

From the viewpoint of achieving simultaneously enhancement in the cleaning property of the detergent composition against the fine particles and enhancement in the storage stability in high concentration, the content ratio of the anionic surfactant (component F) to the nonionic surfactant (component B) [component F (weight %)/component B (weight %)] is 10/1 to 1/5, preferably 8/1 to 1/5, and more preferably 1/1 to 1/5. With the above-mentioned content ratio, it is possible to simultaneously achieve the high cleaning property of the detergent composition and the high storage stability in high concentration, thereby the effect of the present invention will be achieved.

<Optional Components>

The detergent composition in the present invention may contain, in addition to the components A-F, a water-soluble polymer (component G), a preservative, an antioxidant, an antifoaming agent and the like.

[Water-Soluble Polymer (Component G)]

From the viewpoint of enhancing the dispersibility of inorganic fine particles, a water-soluble polymer may be contained in the detergent composition of the present invention. Carboxylic acid-based polymers are preferred as the water-soluble polymers.

Examples of the carboxylic acid-based polymers are acryl acid copolymers, methacrylic acid copolymers, maleic acid copolymers, acrylic acid/methacrylic acid copolymers, acrylic acid/maleic acid copolymers, methacrylic acid/methacrylic acid dimethylamino ester copolymers, methacrylic acid/acrylic acid methyl ester copolymers, and the like. A copolymer where the molar ratio of acrylic acid (AA) to 2-acrylamido-2-methylpropanesulfonate (AMPS) is 91/9 to 95/9 is preferred.

From the viewpoint of obtaining sufficient fine particle removability by preventing the deterioration of fine particle removability that may be caused by the occurrence of agglomeration, it is preferable that the weight-average molecular weight of the water-soluble polymer is 500 to 150,000, more preferably 1000 to 100,000, and even more preferably 1000 to 50,000. The weight-average molecular weight of the water-soluble polymer can be determined by, for example, gel permeation chromatography (GPC) performed under the following conditions.

(GPC Conditions)

Column: G4000PWXL+G2500PWXL (manufactured by Tosoh Corporation)

Eluate: 0.2M Phosphoric acid buffer/$CH_3CN$=9/1 (volume ratio)

Flow rate: 1.0 mL/min

Column temperature: 40° C.

Detection: RI

Sample size: 0.2 mg/mL

Reference material: Polyethylene glycol equivalent

The water-soluble polymer may be a salt of an aforementioned polymer. Such salts are not particularly limited, and specifically, they are alkali metal salts such as sodium salts, potassium salts and the like; and salts in which ethyleneoxide, propylene oxide or the like is added to ammonia, alkyl amine or polyalkyl polyamine, i.e., amino alcohols such as monoethanolamine, diethanolamine, triethanolamine, methylethanolamine, monopropanolamine, dipropanolamine, tripropanolamine, methylpropanolamine, monobutanolamine, aminoethylethanolamine and the like; quarternary ammonium salts such as tetramethylammonium hydroxide, choline and the like; etc.

From the viewpoint of enhancing the dispersibility of the fine particles of the detergent composition and enhancing the rinsing property, the content of the water-soluble polymer (component G) in the detergent composition of the present invention is preferably 1 to 10 weight %, and more preferably 2 to 5 weight % when the total content of the components other than water is 100 weight %.

From the viewpoint of achieving simultaneously establishment of a concentration for developing a remarkable effect in cost reduction of the detergent composition and enhancement in storage stability of the detergent composition, and enhancement of storage stability, the content of the components other than water in the detergent composition of the present invention is preferably 10 to 60 weight %, more preferably 15 to 50 weight % and even more preferably 15 to 40 weight % when the total of the water content and the contents of the other components is 100 weight %.

The detergent composition of the present invention may be used after dilution. In consideration of the cleaning efficiency, the extent of dilution is preferably 10 to 500-fold, more preferably 20 to 200-fold, and even more preferably 50 to 100-fold. Water for dilution may be the same as that for use as the component D as described above.

(Method for Cleaning Glass Surface, Method for Producing Hard Disk)

The method for cleaning a glass surface of the present invention includes a step of cleaning a substrate by using the detergent composition of the present invention. The substrate to be cleaned has a glass surface that has been polished with a polishing composition. In the aforementioned cleaning step, the detergent composition is supplied to the surface of the substrate to be cleaned by (a) immersing the substrate to be cleaned in the detergent composition and/or (b) injecting detergent composition.

In the aforementioned procedure (a), conditions of immersing the substrate to be cleaned in the detergent composition are not particularly limited, and for example, the temperature of the detergent composition is preferably 20 to 100° C. from the viewpoint of safety and operability, and the immersion time is preferably 10 seconds to 30 minutes from the viewpoint of the cleaning property of the detergent composition and production efficiency. In addition, from the viewpoint of enhancing fine particle removability and fine particle dispersibility, it is preferable to apply ultrasonic vibrations to the detergent composition. The ultrasonic frequency is preferably 20 to 2000 kHz, more preferably 40 to 2000 kHz, and even more preferably 40 to 1500 kHz.

In the aforementioned procedure (b), from the viewpoint of promoting fine particle cleaning property and oil dissolvability, it is preferable to clean the surface by bringing the detergent composition into contact with the surface of the substrate to be cleaned by injecting the detergent composition to which ultrasonic vibrations are applied, or to clean by injecting the detergent composition onto the surface and then by rubbing with a cleaning brush the surface provided with the detergent composition. It is further preferable to clean by supplying the detergent composition applied with ultrasonic vibrations to the surface of the object to be cleaned by injection and rubbing with a cleaning brush the surface provided with the detergent composition.

A known means such as a spray nozzle or the like can be used as a means to supply the detergent composition of the present invention to a surface of a substrate to be cleaned. Moreover, a cleaning brush is not particularly limited, and for example, known brushes such as a nylon brush, a PVA (polyvinyl alcohol) sponge brush and the like can be used. It is sufficient that the ultrasonic frequency is represented by the same values as those preferably selected in the procedure (a) described above.

The method for cleaning a glass surface of the present invention may include, in addition to the above-described procedure (a) and/or the above-described procedure (b), one or more steps in which known cleaning such as swinging-cleaning, cleaning using the rotation of a spinner or the like, paddle cleaning, etc., is used.

Examples of the substrate to be cleaned, to which the method of cleaning a glass surface of the present invention is suitably applied, may be a glass substrate including aluminosilicate glass or a crystallized glass, and a glass substrate made of aluminosilicate glass or a crystallized glass. The indices for hardness for these glass substrates, such as Young's modulus and Vickers hardness are higher than those of ordinary glass products for tableware and household utensils. Furthermore, a glass substrate for hard disks has a glass surface roughness considerably lower than that of ordinary glass products for tableware and household utensils (surface average roughness: 3 Å or less). For this reason, in comparison with ordinary glass products for tableware and household utensils, a hard disk glass substrate has a larger area for a contact with inorganic fine particles or the like, and thus, it has a great adsorptive power to inorganic fine particles and the like, and thus the surface is considerably difficult to clean.

On such a hard disk glass substrate, a magnetic layer that has a magnetic recording domain and that includes a metallic thin film is formed by a method such as sputtering, thereby a hard disk is obtained. Examples of metallic materials that may constitute the aforementioned metallic thin film are cobalt alloys that are alloys of chromium, tantalum or platinum with cobalt, and the like. The magnetic layer may be formed on both principal surfaces of the hard disk glass substrate, or it may be formed on only one of the principal surfaces.

The process of producing a hard disk includes a substrate formation step of forming a hard disk glass substrate by conducting a polishing treatment and a cleaning treatment several times in this order a substrate to be polished thereby enhancing the surface smoothness of at least one principal surface of the hard disk glass substrate. The polishing treatment is conducted for example by using a polishing composition that contains inorganic fine particles and a dispersing solvent (e.g., water) for the inorganic fine particles.

In a substrate formation step, a rough polishing treatment and a final polishing treatment are conducted in this order. The surface roughness X of the substrate to be cleaned just after the final polishing is smaller than the surface roughness Y of the substrate to be polished just after the rough polishing treatment. It is preferable that the surface roughness X is ½ or less of the surface roughness Y, more preferably ⅓ or less, and even more preferably ¼ or less.

More specifically, the surface roughness Y of the substrate to be polished just after the rough polishing treatment is preferably 3.0 to 5.0 Å, and more preferably, 2.0 to 3.0 Å. On the other hand, the surface roughness X of the substrate to be polished just after the final polishing treatment is preferably 1.5 to 1.0 Å, and more preferably, 0.5 to 1.0 Å.

The surface roughness X and the surface roughness Y are values obtainable by conducting a three-point measurement at random on one principal surface of a hard disk glass substrate with an atomic force microscope (AFM) and averaging the values. The measurement conditions are as follows.
Atomic force microscope: Nanoscope-IIIa manufactured by Veeco Instruments
Cantilever: NCHV-10
Measurement area: 10 μm×10 μm
Number of scanning: 256

Examples of inorganic fine particles to be contained in a detergent composition that is used in general for a polishing treatment are alumina particles, silica particles, ceric oxide particles, complex oxide particles formed by using ceric oxide and zirconium oxide, and the like. For the inorganic fine particles contained in the polishing composition used in the rough polishing treatment, ceric oxide particles are preferred since high-speed polishing is available. The inorganic fine particles contained in the polishing composition used for the final polishing treatment is preferably silica particles since the surface flatness (low roughness) can be enhanced.

Dirt derived from the polishing composition (inorganic fine particles, organic substances and the like), metallic ions derived from facilities such as apparatuses adhere to the principal surface of the substrate to be polished that has undergone the polishing treatment. The detergent composition of the present invention is preferably used at least during the final cleaning treatment among the above-mentioned cleaning treatments conducted several times.

One example of substrate formation step constituting a method for producing a hard disk of the present invention includes a rough polishing treatment followed by a cleaning treatment using the detergent composition of the present invention (first cleaning treatment), a rinsing treatment (first rinsing treatment), a drying treatment (first drying treatment), a final polishing treatment, a cleaning treatment using the detergent composition of the present invention (second cleaning treatment), a rinsing treatment (second rinsing treatment), and a drying treatment (second drying treatment) that are conducted in this order. In this case, after the rough polishing treatment, only one cleaning treatment is required before the first rinsing treatment, and this is preferable. In the substrate formation step, after the rough polishing treatment, a cleaning treatment using an acidic detergent composition having high solubility of ceric oxide and a rinsing treatment may be conducted before the first cleaning treatment. This is preferable since the removability of ceric oxide particles that tend to chemically adsorbed onto the glass surface is enhanced.

In the method of cleaning glass surface of the present invention, the substrates to be cleaned can be cleaned one by one. Alternatively, a plurality of substrates to be cleaned may be cleaned in a batch. One or plural cleaning tanks may be used for the cleaning.

EXAMPLES

1. Preparation of Detergent Composition

The respective components are blended by weight % and mixed so as to provide the make-ups as listed in Table 1 and Table 2, thereby obtaining the detergent compositions of Examples and Comparative Examples. KOH and NaOH in the tables represent commercially-available aqueous solutions (concentration: 48 weight %).

2. Method for Measuring Cloud Point

The term "cloud point (° C.)" refers to a temperature at which a nonionic surfactant-containing aqueous solution starts to become cloudy when the temperature of the aqueous solution is increased. When the movement of water molecules is increased as the temperature of the aqueous solution is increased, the hydrogen bond between the hydrophilic group portions of the surfactant and the water molecules is broken, and the surfactant thus loses solubility, making the aqueous solution cloudy.

The cloud points of the detergent compositions in Examples and Comparative Examples illustrated in Table 1 and Table 2 can be obtained as follows.
(1) First, place 10 cc of the detergent composition into a 30 cc test tube.
(2) Place the test tube in a warm bath and increase the temperature of the detergent composition at a rate of 1° C./5 sec while manually stirring the detergent composition using a glass stem thermometer.
(3) Read the temperature of the detergent composition when the detergent composition remains cloudy even with stirring.
(4) Remove the test tube out of the warm bath and gradually lower the temperature while stirring the detergent composition with a stirring rod under a 25° C. atmosphere.
(5) Read the temperature when the detergent composition becomes transparent.
(6) Repeat steps (2) to (5) twice, and the average of the temperatures read in step (3) is regarded as the cloud point.

3. Method for Testing Storage Stability

Evaluation of storage stabilities of the detergent compositions in Examples and Comparative Examples illustrated in Table 1 and Table 2 were conducted in the following manner.
(1) First, place 40 cc of the detergent composition into 50 cc screw tubes made of glass.
(2) Place the screw tubes containing the detergent compositions in incubators at 60° C. and 0° C. respectively and leave the tubes for one month.
(3) Remove the tubes out of the incubators after one month and check any abnormality in appearance (e.g., precipitation and whitening) and variation in physical properties (e.g., pH and viscosity) of the detergent compositions.

<Evaluation>
A: There is no abnormality in appearance and variation in physical properties.
B: At least either abnormality in appearance or variation in physical properties is confirmed.

4. Method for Testing Cleaning Property of Glass HD Substrate

By performing polishing by use of a polishing slurry of the below-mentioned composition (polishing composition), a substrate to be cleaned that was soiled with grains derived from a polishing solution, organic dirt, polishing dust derived from the substrate material and the like was prepared. By using this substrate, the cleaning property of the diluted solutions of the detergent composition was evaluated.
(Polishing Condition)
Polishing machine: Double-side 9B polisher (manufactured by Hamano Co., Ltd.)
Polishing pad: Suede pad for final polishing manufactured by FILWEL Co., Ltd.
Polishing composition: Colloidal silica slurry (the number average particle diameter: 24 nm, 8%; manufactured by Kao Corporation)
Preliminary polishing: load is 40 g/cm$^2$, time is 60 seconds, flow rate of polishing solution is 100 mL/min
Main polishing: load is 100 g/cm$^2$, time is 1200 seconds, flow rate of polishing solution is 100 mL/min
Water rinsing: load is 40 g/cm$^2$, time is 60 seconds, flow rate of rinsing water is about 2 L/min
Substrate to be cleaned: Glass HD substrate (outer diameter: 65 mm$\phi$, inner diameter: 20 mm$\phi$, thickness: 0.635 mm)
(Cleaning)
Each of the soiled substrates to be cleaned was cleaned by using a cleaning apparatus under the conditions below.
(1) Cleaning—1: Immerse the substrate to be cleaned into a resin tank containing a diluted solution of a detergent composition (40° C.) whose dilution ratio has been adjusted with ultrapure water as shown in the tables, and clean the substrate for 120 seconds while irradiating with ultrasonic wave (40 kHz).
(2) Rinsing—1: Move the substrate to be cleaned into a resin tank containing ultrapure water (40° C.), and rinse for 120 seconds while irradiating with ultrasonic wave (40 kHz).
(3) Repeat steps (1) and (2).
(4) Cleaning—2: Move the substrate to be cleaned from the interior of the resin tank into a scrub-cleaning unit equipped with cleaning brushes. Inject a diluted solution of the detergent composition at room temperature (25° C.) toward the cleaning brush and conduct a cleaning at 25° C. for 5 seconds by pressing the cleaning brushes onto the both surfaces of the substrate while rotating the brushes at 400 rpm under presence of the detergent composition. For the detergent composition, the same make-up as the detergent composition used in "(1) Cleaning—1" is used.
(5) Rinsing—2: Move the substrate to be cleaned into a subsequent scrub-cleaning unit, inject ultrapure water at room temperature, and conduct rinsing for 5 seconds by pressing cleaning brushes onto the both surfaces of the substrate while rotating the brushes at 400 rpm.
(6) Repeat steps (4) and (5).
(7) Rinsing—3: Move the substrate into a resin tank containing ultrapure water and conduct rinsing for 10 seconds at 40° C.

(8) Drying: Move the substrate into a resin tank containing warm pure water and immerse for 60 seconds. Thereafter, pull out the substrate to be cleaned at a rate of 250 mm/min and leave it under a temperature of 60° C. for 420 seconds so as to dry the substrate surfaces completely.

(Evaluation of Cleaning Property)

The cleaned substrate rotating at 10000 rpm was irradiated with a laser beam by use of MODE-Q-Scatter of an optical microdefect inspection system (Candela 6100 manufactured by KLA Tencor Corporation) so as to perform measurement of the defect number (number of foreign matters on the substrate). The measurement was performed for 10 substrates for each of the detergent compositions in the Examples and Comparative Example so as to obtain the mean values, and the cleaning property was evaluated with a relative value by setting the defect numbers of the detergent composition in Comparative Example 1 as 100. The results are shown in Tables 1 and 2.

As shown in Table 1, the detergent compositions in Examples 1-11 contain the compositions A-F respectively, and the content ratio (composition E/composition B) is 1/1.5 to 15/1, the content ratio (composition F/composition B) is 10/1 to 1/5, thereby a high cleaning property and a high storage stability are achieved simultaneously.

TABLE 1

| | | Components | Ex. 1 | Ex. 2 | Ex. 3 | Ex. 4 | Ex. 5 | Ex. 6 |
|---|---|---|---|---|---|---|---|---|
| *1 | A | KOH | 6.7(32.3) | 6.7(32.5) | 6.7(32.6) | 6.7(38.7) | 6.7(39.0) | 6.7(31.2) |
| | | NaOH | 0.8(3.9) | 0.6(2.9) | 0.4(2.0) | 0.5(2.9) | 0.4(2.3) | 0.8(3.7) |
| *2 | B | $C_{12}$—O—$(EO)_6$—H | 2.5(12.1) | 2.5(12.1) | 2.5(12.2) | 2.5(14.5) | 2.5(14.6) | 2.5(11.6) |
| | | $CH_3CH(CH_2CH_3)$—$C_4$—O—$(EO)_{20}$—H | | | | | | |
| *3 | C | *9 | 4.2(20.3) | 4.2(20.4) | 4.2(20.5) | 4.2(24.3) | 4.2(24.4) | 4.2(19.5) |
| | | *10 | | | | | | |
| *4 | D | Ultrapure water | 79.3 | 79.4 | 79.5 | 82.7 | 82.8 | 78.5 |
| *5 | E | $C_6$—O—$(EO)_3$—$CH_2COOH$ | 5.6(27.0) | | | | | 5.6(26.1) |
| | | $C_8$—O—$(EO)_5$—$CH_2COOH$ | | 5.7(27.7) | | | | |
| | | $C_8$—O—$(EO)_8CH_2COOH$ | | | 5.8(28.3) | | | |
| | | $C_6$—$CH_2COOH$ | | | | 2.5(14.4) | | |
| | | $C_8$—$CH_2COOH$ | | | | | 2.5(14.5) | |
| | | $C_4$—$CH(CH_2CH_3)COOH$ | | | | | | |
| *6 | | $C_{12-14}$—O—$(EO)_{45}$—$CH_2COOH$ | | | | | | |
| | | $C_{10}$—$CH_2COOH$ | | | | | | |
| | | $C_{12}$—O—$(EO)_{10}$—$CH_2COOH$ | | | | | | |
| *7 | F | *11 | 0.9(4.4) | 0.9(4.4) | 0.9(4.4) | 0.9(5.2) | 0.9(5.2) | 0.9(4.2) |
| *8 | | *12 | | | | | | |
| | G | Anionic polymer (A6016) | | | | | | 0.8(3.7) |
| | | *13 | 2.2/1 | 2.3/1 | 2.3/1 | 1/1 | 1/1 | 2.2/1 |
| | | *14 | 1/2.8 | 1/2.8 | 1/2.8 | 1/2.8 | 1/2.8 | 1/2.8 |
| | | pH (undiluted solution/25° C.) | 13.6 | 13.6 | 13.6 | 13.5 | 13.5 | 13.6 |
| *15 | | Cloud point | 90° C.< | 90° C.< | 90° C.< | 90° C.< | 90° C.< | 90° C.< |
| | | *17 | A | A | A | A | A | A |
| | | *18 | A | A | A | A | A | A |
| *16 | | Dilution rate | 100 | 100 | 100 | 100 | 100 | 100 |
| | | *19 | 71 | 74 | 82 | 70 | 80 | 55 |

| | | Components | Ex. 7 | Ex. 8 | Ex. 9 | Ex. 10 | Ex. 11 |
|---|---|---|---|---|---|---|---|
| *1 | A | KOH | 13.4(37.0) | 13.4(36.7) | 6.7(35.8) | 6.7(33.0) | 6.7(30.7) |
| | | NaOH | 1.0(2.8) | 1.3(3.6) | 0.8(4.3) | 0.8(3.9) | 0.8(3.7) |
| *2 | B | $C_{12}$—O—$(EO)_6$—H | 5.0(13.8) | 5.0(13.7) | 0.5(2.7) | 2.5(12.3) | 0.5(2.3) |
| | | $CH_3CH(CH_2CH_3)$—$C_4$—O—$(EO)_{20}$—H | | | | | |
| *3 | C | *9 | 8.4(23.2) | 8.4(23.0) | 4.2(22.5) | 4.2(20.7) | 4.2(19.3) |
| | | *10 | | | | | |
| *4 | D | Ultrapure water | 63.8 | 63.5 | 81.3 | 79.7 | 78.2 |
| *5 | E | $C_6$—O—$(EO)_3$—$CH_2COOH$ | | | 5.6(29.9) | 5.6(27.6) | 5.6(25.7) |
| | | $C_8$—O—$(EO)_5$—$CH_2COOH$ | | | | | |
| | | $C_8$—O—$(EO)_8CH_2COOH$ | | | | | |
| | | $C_6$—$CH_2COOH$ | 5.0(13.8) | | | | |
| | | $C_8$—$CH_2COOH$ | | | | | |
| | | $C_4$—$CH(CH_2CH_3)COOH$ | | 5.0(13.6) | | | |
| *6 | | $C_{12-14}$—O—$(EO)_{45}$—$CH_2COOH$ | | | | | |
| | | $C_{10}$—$CH_2COOH$ | | | | | |
| | | $C_{12}$—O—$(EO)_{10}$—$CH_2COOH$ | | | | | |
| *7 | F | *11 | 1.8(5.0) | 1.8(5.0) | 0.9(4.8) | 0.5(2.5) | 4.0(18.3) |
| *8 | | *12 | | | | | |
| | G | Anionic polymer (A6016) | 1.6(4.4) | 1.6(4.4) | | | |
| | | *13 | 1/1 | 1/1 | 11.2/1 | 2.2/1 | 11.2/1 |
| | | *14 | 1/2.8 | 1/2.8 | 1.8/1 | 1/5 | 8/1 |
| | | pH (undiluted solution/25° C.) | 14.1 | 14.1 | 13.6 | 13.6 | 13.7 |
| *15 | | Cloud point | 90° C.< | 90° C.< | 90° C.< | 90° C.< | 90° C.< |
| | | *17 | A | A | A | A | A |
| | | *18 | A | A | A | A | A |

TABLE 1-continued

|  | | | | | | |
|---|---|---|---|---|---|---|
| *16 | Dilution rate | 200 | 200 | 100 | 100 | 100 |
|  | *19 | 48 | 49 | 94 | 81 | 90 |

Note:
numerical values in parentheses denote weight % of respective components when the total of contents of components other than water is 100 weight %.
Ex.: Example

TABLE 2

|  |  | Components | Com. Ex. 1 | Com. Ex. 2 | Com. Ex. 3 | Com. Ex. 4 | Com. Ex. 5 | Com. Ex. 6 |
|---|---|---|---|---|---|---|---|---|
| *1 | A | KOH | 6.7(32.7) | 6.7(39.0) | 6.7(22.6) | 6.7(36.2) | 6.7(33.5) | 6.7(28.2) |
|  |  | NaOH | 0.5(2.4) | 0.4(2.3) | 0.8(2.7) | 0.8(4.3) | 0.8(4.0) | 0.8(3.4) |
| *2 | B | $C_{12}$—O—$(EO)_6$—H | 2.5(12.2) | 2.5(14.6) | 11.2(37.7) | 0.3(1.6) | 2.5(12.5) | 0.5(2.1) |
|  |  | $CH_3CH(CH_2CH_3)$—$C_4$—O—$(EO)_{20}$—H | | | | | | |
| *3 | C | *9 | 4.2(20.5) | 4.2(24.4) | 4.2(14.1) | 4.2(22.7) | 4.2(21.0) | 4.2(17.6) |
|  |  | *10 | | | | | | |
| *4 | D | Ultrapure water | 79.5 | 82.8 | 70.3 | 81.5 | 80.0 | 76.2 |
| *5 | E | $C_6$—O—$(EO)_3$—$CH_2COOH$ | | | 5.6(18.9) | 5.6(30.3) | 5.6(28.0) | 5.6(23.5) |
|  |  | $C_8$—O—$(EO)_5$—$CH_2COOH$ | | | | | | |
|  |  | $C_8$—O—$(EO)_8$—$CH_2COOH$ | | | | | | |
|  |  | $C_6$—$CH_2COOH$ | | | | | | |
|  |  | $C_8$—$CH_2COOH$ | | | | | | |
|  |  | $C_4$—$CH(CH_2CH_3)COOH$ | | | | | | |
| *6 |  | $C_{12-14}$—O—$(EO)_{45}$—$CH_2COOH$ | 5.7(27.8) | | | | | |
|  |  | $C_{10}$—$CH_2COOH$ | | 2.5(14.5) | | | | |
|  |  | $C_{12}$—O—$(EO)_{10}$—$CH_2COOH$ | | | | | | |
| *7 | F | *11 | 0.9(4.4) | 0.9(5.2) | 1.2(4.0) | 0.9(4.9) | 0.2(1.0) | 6.0(25.2) |
| *8 |  | *12 | | | | | | |
|  | G | Anionic polymer (A6016) | | | | | | |
|  |  | *13 | 2.3/1 | 1/1 | 1/2 | 18.7/1 | 2.2/1 | 11.2/1 |
|  |  | *14 | 1/2.8 | 1/2.8 | 1/9.3 | 3/1 | 1/12.5 | 12/1 |
|  |  | pH (undiluted solution/25° C.) | 13.6 | Insoluble | 13.8 | 13.5 | 13.5 | 13.7 |
| *15 |  | Cloud point | 60° C. | — | 62° C. | 90° C.< | 90° C.< | 90° C.< |
|  |  | *17 | B | — | A | A | A | A |
|  |  | *18 | A | — | A | A | A | B |
| *16 |  | Dilution rate | 100 | — | 100 | 100 | 100 | 100 |
|  |  | *19 | 100 | — | 108 | 128 | 125 | 83 |

|  |  | Components | Com. Ex. 7 | Com. Ex. 8 | Com. Ex. 9 | Com. Ex. 10 | Com. Ex. 11 |
|---|---|---|---|---|---|---|---|
| *1 | A | KOH | | | 10.1(26.7) | | |
|  |  | NaOH | 4.0(69.0) | | | 4.0(35.4) | 4.0(32.8) |
| *2 | B | $C_{12}$—O—$(EO)_6$—H | | | 3.8(10.0) | | |
|  |  | $CH_3CH(CH_2CH_3)$—$C_4$—O—$(EO)_{20}$—H | 1.2(20.7) | | | 1.2(10.6) | 1.2(9.8) |
| *3 | C | *9 | | | 6.3(16.7) | | |
|  |  | *10 | | 0.5(9.1) | | 0.5(4.4) | 0.5(4.1) |
| *4 | D | Ultrapure water | 94.2 | 94.5 | 62.2 | 88.7 | 87.8 |
| *5 | E | $C_6$—O—$(EO)_3$—$CH_2COOH$ | | | | | |
|  |  | $C_8$—O—$(EO)_5$—$CH_2COOH$ | | | | | |
|  |  | $C_8$—O—$(EO)_8$—$CH_2COOH$ | | | | | |
|  |  | $C_6$—$CH_2COOH$ | | | | | 0.45(3.7) |
|  |  | $C_8$—$CH_2COOH$ | | | | | |
|  |  | $C_4$—$CH(CH_2CH_3)COOH$ | | | | | 0.45(3.7) |
| *6 |  | $C_{12-14}$—O—$(EO)_{45}$—$CH_2COOH$ | | | | | |
|  |  | $C_{10}$—$CH_2COOH$ | | | | | |
|  |  | $C_{12}$—O—$(EO)_{10}$—$CH_2COOH$ | 0.6(10.3) | | | 0.6(5.3) | 0.6(4.9) |
| *7 | F | *11 | | 5.0(90.9) | 1.4(3.7) | 5.0(44.3) | 5.0(41.0) |
| *8 |  | *12 | | | 15.0(39.7) | | |
|  | G | Anionic polymer (A6016) | | | 1.2(3.2) | | |
|  |  | *13 | 1/2 | — | — | 1/2 | 1.25/1 |
|  |  | *14 | — | — | 1/2.7 | 4.2/1 | 4.2/1 |
|  |  | pH (undiluted solution/25° C.) | 13.6 | 10.4 | 13.7 | Insoluble | Insoluble |
| *15 |  | Cloud point | 69° C. | — | 90° C.< | — | — |
|  |  | *17 | A | A | A | — | — |
|  |  | *18 | A | A | B | — | — |

TABLE 2-continued

| *16 | Dilution rate | 100 | 100 | 200 | — | — |
|---|---|---|---|---|---|---|
|  | *19 | 169 | 489 | 65 | — | — |

Note:
numerical values in parentheses denote weight % of respective components when the total of contents of components other than water is 100 weight %.
Com. Ex.: Comparative Example
*1: Alkaline agent
*2: Nonionic surfactant
*3: Chelating agent
*4: Water
*5: Ether carboxylate or fatty acid contained in detergent composition of the present invention
*6: Ether carboxylate or fatty acid other than component E
*7: Anionic surfactant contained in detergent composition of the present invention.
*8: Anionic surfactant other than component F
*9: 1-hydroxyethylidene-1,1-diphosphonate
*10: Ethylenediamine sodium tetraacetate
*11: Sodium dodecylbenzenesulfonate
*12: p-toluene sodium sulphonate
*13: Content ratio (ether carboxylate or fatty acid)/(nonionic surfactant)
*14: Content ratio (anionic surfactant)/(nonionic surfactant)
*15: Storage stability
*16: Cleaning property evaluation (* value relative to defect number 100 in Comparative Example 1)
*17: High temperature stability (preserved at 60° C. for one month)
*18: Low temperature stability (preserved at 0° C. for one month)
*19: Cleaning property of glass HD substrate; relative value The details for the respective components in Table 1 and Table 2 are as follows.

(1) The numerical values attached to C (carbon) in Table 1 and Table 2 represent carbon numbers of hydrocarbon. $C_{12-14}$—O-$(EO)_{4.5}$—$CH_2COOH$ is a mixture of $C_{12}$—O-$(EO)_{4.5}$—$CH_2COOH$ and $C_{14}$—O-$(EO)_{4.5}$—$CH_2$ COOH. Both $R^4$ of the component B and $R^1$, $R^2$ of component E are alkyl groups.

(2) Anionic polymer: copolymer sodium salt of acrylic acid and 2-acrylamido-2-methylpropanesulfonate: 40 weight % aqueous solution, [Trade name "Aron A-6016" manufactured by Toagosei, Co., Ltd., weight average molecular weight: 12000 (in terms of polyethylene glycol), AA/AMPS weight ratio is 80:20 weight %, molar ratio is 92:8%]

INDUSTRIAL APPLICABILITY

By diluting the detergent composition of the present invention as required and using the detergent composition or the diluted solution, a highly purified glass surface for a hard disk glass substrate can be obtained. Therefore, the present invention can contribute to enhance the yield of products.

The invention claimed is:

1. An alkaline detergent composition for hard surface, comprising:
   an alkaline agent (component A);
   a nonionic surfactant (component B);
   a chelating agent (component C);
   water (component D);
   at least one carboxylic acid compound (component E) selected from the group consisting of compounds represented by general formula (1) and general formula (2) below; and
   at least one anionic surfactant (component F) selected from the group consisting of surfactants represented by general formula (3) and salts thereof, where the content ratio [component E (weight %)/component B (weight %)] is 1/1.5-15/1,
   the content ratio [component F (weight %)/component B (weight %)] is 10/1-1/5, and
   a pH at 25° C. is 12 or greater:

$$R^1\text{—O-}(EO)_n\text{—}CH_2COOH \quad (1)$$

in general formula (1), $R^1$ is a linear or branched alkyl group having a carbon number of 4 to 8, EO is an oxyethylene group, the character n represents an average number of added moles of EO which meets $1 \leq n \leq 10$;

$$R^2COOH \quad (2)$$

in general formula (2), $R^2$ is a linear or branched alkyl group having a carbon number of 4 to 10;

[Chemical formula 1]

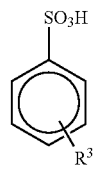

(3)

in general formula (3), $R^3$ is a linear or branched alkyl group having a carbon number of 8 to 18.

2. The alkaline detergent composition for hard surface according to claim 1, wherein the content of the components other than water (component D) is 10 to 60 weight %.

3. The alkaline detergent composition for hard surface according to claim 1, further comprising a water-soluble polymer.

4. The alkaline detergent composition for hard surface according to claim 1, which is used for cleaning a hard disk glass substrate.

5. A method for cleaning a glass surface, comprising a cleaning step of cleaning a substrate to be cleaned having a glass surface with a diluted solution obtained by diluting to 10 to 500-fold the alkaline detergent composition for hard surface according to claim 1,
   wherein the content of the components other than water (component D) of the alkaline detergent composition for hard surface is 10 to 60 weight %.

6. The alkaline detergent composition for hard surface according to claim 1, wherein the content of the components other than water (component D) is 10 to 40 weight %.

7. The alkaline detergent composition for hard surface according to claim 2, further comprising a water-soluble polymer.

8. The alkaline detergent composition for hard surface according to claim 2, which is used for cleaning a hard disk glass substrate.

9. A method for cleaning a hard disk glass substrate, comprising a cleaning step of cleaning a hard disk glass substrate with a diluted solution obtained by diluting to 10 to 500-fold the alkaline detergent composition for hard surface according to claim 1, wherein the content of the components other than water (component D) of the alkaline detergent composition for hard surface is 10 to 60 weight %.

* * * * *